US008708296B2

(12) United States Patent
Nemoto (10) Patent No.: US 8,708,296 B2
(45) Date of Patent: Apr. 29, 2014

(54) ARTICLE HOLDING DEVICE (75) Inventor: Takehiko Nemoto, Yokohama (JP)

(73) Assignee: NIFCO Inc., Yokohama-shi (JP)

( * ) Notice: Subject to any disclaimer, the term of this patent is extended or adjusted under 35 U.S.C. 154(b) by 67 days.

(21) Appl. No.: 13/138,978

(22) PCT Filed: Apr. 27, 2010

(86) PCT No.: PCT/JP2010/057507
§ 371 (c)(1),
(2), (4) Date: Jan. 20, 2012

(87) PCT Pub. No.: WO2010/131577
PCT Pub. Date: Nov. 18, 2010

(65) Prior Publication Data
US 2012/0126083 A1    May 24, 2012

(30) Foreign Application Priority Data

May 13, 2009   (JP) .................................. 2009-116258

(51) Int. Cl.
*A47B 91/00*   (2006.01)
(52) U.S. Cl.
USPC .................................. 248/346.06; 248/316.4
(58) Field of Classification Search
USPC ............... 248/346.01, 346.03, 346.06, 346.5, 248/292.12, 298.1, 310, 316.8, 685, 686, 248/27.1, 27.3, 316.1, 316.4; 108/44, 45; 312/330.1; 361/724, 725, 679.56, 361/679.3, 727; 379/455, 454, 428.01; 269/43, 45, 289 R; 74/29, 31, 32, 33, 74/34, 422
See application file for complete search history.

(56) References Cited

U.S. PATENT DOCUMENTS

| 5,438,936 | A | * | 8/1995 | Wang ............................... 108/44 |
| 5,836,563 | A | * | 11/1998 | Hsin-Yung .................. 248/316.4 |
| 7,272,984 | B2 | * | 9/2007 | Fan ............................... 74/89.17 |
| 7,407,143 | B1 | * | 8/2008 | Chen .......................... 248/309.1 |
| 7,537,190 | B2 | * | 5/2009 | Fan ............................. 248/309.1 |
| 7,580,254 | B2 | * | 8/2009 | Anderson ................ 361/679.41 |
| 2007/0262223 | A1 | * | 11/2007 | Wang et al. .............. 248/346.07 |
| 2007/0284500 | A1 | * | 12/2007 | Fan ........................... 248/346.06 |

FOREIGN PATENT DOCUMENTS

| CN | 2676512 Y | 2/2005 |
| DE | 195 42 720 | 6/1997 |
| JP | H09-027843 | 1/1997 |
| JP | H09-193690 | 7/1997 |

(Continued)

OTHER PUBLICATIONS

Chinese Patent Office, "Office Action for CN 2010800021347.4", Jul. 24, 2013.

*Primary Examiner* — Alfred J Wujciak
(74) *Attorney, Agent, or Firm* — Manabu Kanesaka (57) ABSTRACT The article holding device (9) of the present invention includes a base (1), a holding member (2) capable of sliding along a grip width of gripping an article (K), and a locking device (4) for holding in a position after sliding and adjusting the holding member (2), wherein the locking device (4) include a gear (40), an engaging portion 33 capable of coupling with the gear (40), an urging member (S2) for applying an urging force for causing the engaging portion (33) to couple with the gear (40), a rack (23) provided on the holding member, a pinion (44) engaging the rack (23) and being placed roughly coaxially with the gear (40), and a one-way clutch (46) interposed between the gear (40) and the pinion (44) and configured to become disconnected from the gear (40) and to be slipped only when the pinion (44) is rotated in one direction.

5 Claims, 10 Drawing Sheets

(56) References Cited

FOREIGN PATENT DOCUMENTS

| | | |
|---|---|---|
| JP | U 3051744 | 9/1998 |
| JP | 2003-232309 | 8/2003 |
| JP | 2004-210150 | 7/2004 |
| JP | 2008-202771 | 9/2008 |
| JP | 2010-023786 | 2/2010 |

\* cited by examiner

PRIOR ART

ARTICLE HOLDING DEVICE

TECHNOLOGICAL FIELD

The present invention relates to an article holding device when using an article, particularly a cellular telephone, music player, or the like, in a state being held on a dashboard, or the like, inside a vehicle compartment.

BACKGROUND TECHNOLOGY

Figure 16:
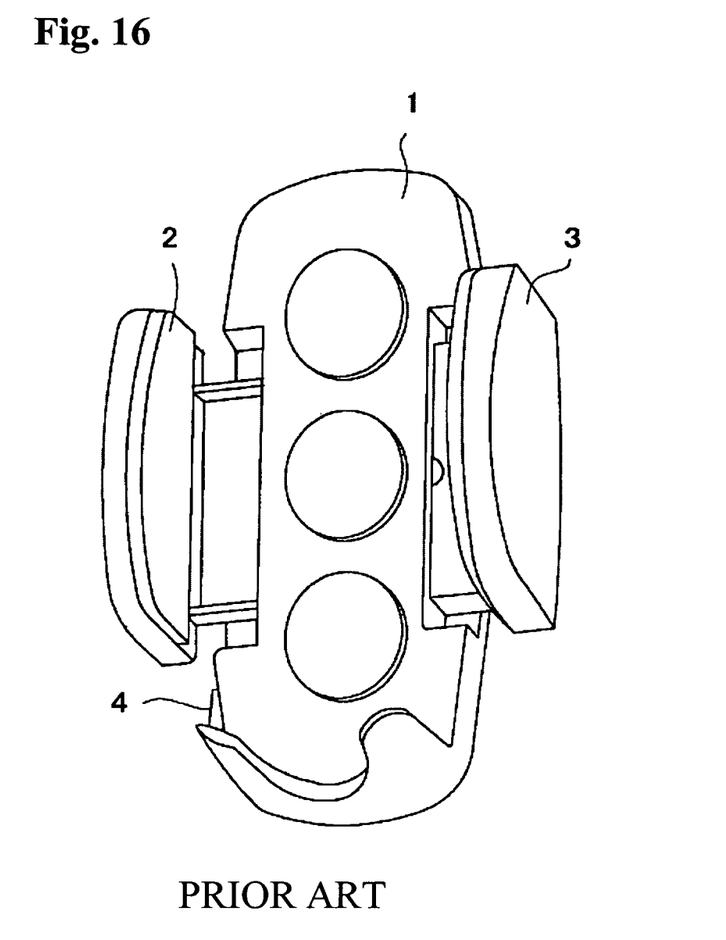
FIG. 16 is an explanatory diagram showing a conventional article holding device disclosed in Patent Document 1.

All kinds of article holding devices have been used from the past for holding cellular telephones and other articles in a gripped state on a dashboard, or the like, inside a vehicle compartment. Also, of such article holding devices, there is a type in which a grip width is easily variably adjusted whereby articles having different width dimensions can be held. FIG. 16 illustrates an article holding device disclosed in Patent Document 1, German Patent Publication No. 19542720, as a conventional example. This article holding device has a base 1, holding members 2 and 3, and a release button 4. The holding members 2 and 3 are provided in a direction orthogonal to a long direction of the base 1, and grip an article disposed on the base from both sides. Here, at least one of the holding members 2 and 3 is provided to be capable of sliding so as to be able to change a width of gripping an article with the holding member 2 and the holding member 3 in accordance with a height of the article.

Also, the holding member 2 and the holding member 3 are urged in a direction of widening of the distance between the two, by an urging force from an urging member not illustrated. The release button 4 has a portion to be pressed and locking device provided on the opposite side. Also, the locking device of the release button 4 couple with a gear that rotates together with movement of the holding members 2 and 3. Here, the locking device of the release button 4 is urged to the above-mentioned gear by an urging force from an urging member not illustrated. Also, a force opposing the abovementioned urging force is applied to the abovementioned locking device, and the coupling between the release button 4 and the abovementioned gear is released, by pressing of the release button 4 (in opposition to the abovementioned urging force).

Also, when the coupling between the release button 4 and the abovementioned gear is released by pressing of the release button 4, the holding member 2 and the holding member 3 are moved by the abovementioned urging force up to a position where the distance between the two becomes maximal. Also, at this time, the distance between the holding member 2 and the holding member 3 is maintained by coupling of the engaging device of the release button 4 with the abovementioned gear. Also, to hold an article, the release button 4 is pressed in a state in which the article is placed on the base 1, and pressing of the release button 4 is then stopped after the holding members 2 and 3 have been moved in a direction to move closer to each other in opposition to the abovementioned urging force up to contact the holding members 2 and 3 to both sides of the article, whereby the article is held. The release button 4 is pressed to release holding of the article. The coupling between the engaging device of the release button 4 and the abovementioned gear is thereby released, and the holding member and the holding member 3 are moved by the abovementioned urging force up to a position where the distance between the two becomes maximal.

Patent Document 1: German Patent Publication No. 19542720

DISCLOSURE OF THE INVENTION

Problems to be Solved by the Invention

Although the abovementioned article holding device can stably hold an article without rattling and the state of holding of the article can be released at once by pressing of the release button 4, there are problems such as the following. Specifically, in such article holding device, because the engaging device of the release button 4 and the gear are always engaged as long as the release button 4 is not pressed, a clicking sound is produced by rotation of the gear while contacting the engaging device on the side of the release button 4 when the holding member 2 and the holding member 3 are slid in a direction narrowing the distance between the two. Also, because the holding members 2 and 3 are moved immediately by the abovementioned urging force up to a position where the distance between the two becomes maximal when the release button 4 is pressed, an impact sound is produced at that time giving discomfort to the user. The problems such as the above are the same also in the case of a configuration in which an urging force is applied to the holding members 2 and 3 in a direction in which the distance between the two is reduced.

An object of the present invention is to solve problems such as the above, and to provide a holding tool to which a rotary damper can be easily added as needed.

Means for Solving the Problems

In order to achieve the abovementioned object, the present invention is an article holding device, comprising a base for placing an article, a holding member capable of sliding along a grip width of gripping an article, and locking device including a gear, a release button coupling and decoupling the gear, and an urging member applying an urging force in a direction of coupling the release button with the gear, for holding in a position after sliding and adjusting the holding member, wherein the locking device includes a rack provided on the holding member, a pinion engaging with the rack and being placed roughly coaxially with the gear, and a one-way clutch interposed between the gear and the pinion and configured to become disconnected from the gear and to slip only when the pinion is rotated in one direction.

Also, in the article holding device of the present invention, the locking device preferably further includes an urging member for applying an urging force for causing the engaging portion to couple with the gear, and a release button releasing the coupling between the engaging portion and the gear by being pressed.

Also, in the article holding device of the present invention, the one-way clutch preferably causes the pinion to slip against the gear when the holding member is slid in a direction of reducing the grip width, and preferably puts the pinion and the gear in the connected state when the holding member is slid in a direction of enlarging the grip width by pressing of the release button and releasing of the coupling between the engaging portion and the gear.

Also, the article holding device of the present invention is preferably switched between a housing position housed in a housing space on the side of a vehicle and a drawn-out position drawn out from the housing space.

Also, the article holding device of the present invention is preferably fixed to a slider capable of sliding inside a housing embedded in the housing space, and is preferably switched by way of the slider between the housing position housed inside the housing and the drawn-out position drawn out from an opening provided on one end of the housing.

Also, the article holding device of the present invention is preferably connected to the slider by way of an adjustable connection device, and is preferably connected to be capable of adjusting an angle downward and to be capable of adjusting rotation to the left and right in the drawn-out position. A tilting mechanism described in Japanese Patent Application Publication No. 2010-023786 and a rotating mechanism and angle adjusting mechanism disclosed in Japanese Patent Application Publication No. 2004-210150 also may be included.

BEST MODE FOR CARRYING OUT THE INVENTION

An embodiment of the present invention is described below while referring to the attached drawings. The structure of the article holding device 9, the structure for supporting and receiving the article holding device 9, and the operating characteristics of the article holding device 9 are described in detail in sequence in the description below.

(Structure of Article Holding Device 9)

The article holding device 9 of the present embodiment has a board-form base 1 for placing an article K, a holding member 2 disposed to be capable of sliding on one side of the base 1, an urging member S1 for applying an urging force to the holding member 2, and locking device 4 for holding in a position after sliding the holding member 2.

The base 1 has a flat board part 10 for placing the article K, an extended part 11 provided on one end side in the long direction of the flat board part 10, and a holding piece part 12 provided roughly in the middle of one edge part following the long direction on the flat board part 10. The extended part 11 projects in a direction orthogonal to the surface direction of the flat board part 10. Also, the holding piece part 12 projects in the same direction as the extended part 11 from the abovementioned one end side of the flat board part 10. The members described later are placed on the underside of the flat board part 10 of the base 1, that is, on the opposite side in the direction of projection of the extended part 11 and the holding piece part 12 of the flat board part 10, and the members are covered by a cover 17. An opening 13a cut out into a roughly rectangular shape is provided inside an edge part on the opposite side of the edge part in the short direction (width direction) of the flat board part 10 where the holding piece part 12 is provided. Also, a roughly rectangular opening 13b cutting out one edge part in the width direction is provided near the extended part 11 on the edge part of the flat board part 10 where the holding piece part 12 is provided. Also, boss-form shaft parts 10a respectively projecting in the width direction of the flat board part 10 are provided on both side parts of the edge part on the opposite side of the extended part 11 in the long direction of the flat board part 10. Also, a buffering cushion material C1 of nonwoven cloth, or the like, is provided on the upper face of the flat board part 10.

Also, a plurality of placement spaces delineated by partition walls is provided on the underside of the flat board part 10. For example, a pinion 44, a gear 38, a gear 40, a rotary damper 35, a clutch member 46, being one example of a one-way clutch, and the like, are placed in a placement space 14 provided toward the side of the extended part 11 from the middle in the long direction on the underside of the flat board part 10. Also, a sliding board part 21 of the holding member 2, and the like, are placed in a placement space 15 provided on the opposite side of the extended part 11 with respect to the placement space 14. Also, an urging member S1 is placed in a placement space 15b provided adjacent to the placement space 15. Also, a release button 3 is placed in a placement space 16 provided further to the side of the extended part 11 from the placement space 14.

A rib 10b, a boss 10c, installation holes 10d, and a bearing part 16a are further provided on the underside of the flat board part 10. The rib 10b is provided following the width direction of the flat board part 10 on the opposite side of the extended part 10 in the long direction of the flat board 10. The boss 10*c* is provided in a position corresponding to a positioning hole 18*c* on the cover 17, to be described later, covering the underside of the flat board part 10, and couples with the positioning hole 18*c*. The installation holes 10*d* are installation holes provided in a plurality of places on the underside of the flat board part 10. The symbol 16*a* indicates a bearing part provided toward the side of the extended part 11 inside the placement space 16, to contact one end part of an urging member S2.

A clearance part 15*a* where the height of the partition wall is formed lower than the other portions is provided on the partition wall delineating the placement space 14 and the placement space 15 so that the sliding board part 21 of the holding member 2 and the gear 40 do not collide.

A rotating board 25 capable of rotating roughly 90 degrees, an urging member S3 for urging the rotating board 25 in a direction of standing up, and a pair of restricting pieces 27 for restricting the rotating board 25 so as not to rotate to the upper face side of the flat board part 10 are provided on an end part on the opposite side of the extended part 11 in the long direction of the flat board part 10. Also, the rotating board 25 is urged by an urging member S3 placed on one side of the lower end side, with one end being stopped on the side of the rib 10*b* or the flat board part 10 and the other end pressing with a prescribed urging force, and is in contact with a restricting part 29 on the side of the restricting piece. This makes holding possible in a case such as when the article as an object is longer than the flat board part 10, by rotating the rotating board 25 in opposition to the urging force of the urging member S3 to lengthen the flat board part 10 in the amount of the rotating board.

As opposed to this, a space 11*a* inside of the extended part 11 has a size sufficient for placement of an adjustable connection device 7 to be described later. This space 11*a* has a rectangular container form of a generally inverted concave form, and has a window part 11*b* cutting out a middle part of a rear wall part, clearance holes 11*d* provided on an upper face inside the concavity, and locking hole 11*c* for cover provided on an upper side of the concavity on the rear wall part.

The holding member 2 has a roughly L-shaped body 20, and has a sliding board part 21, and a holding piece part 22 provided roughly perpendicular to the sliding board part 21. A rack 23 is formed on one side face of the sliding board part 21. Also, a bearing part 24 projecting in a direction orthogonal to the direction of sliding of the sliding board part 21 is provided on the other side face of the sliding board part 21. Also, the rack 23 is provided along an end face of a step part provided on the abovementioned one side face. The sliding board part 21 of the holding member 2 is placed in the opening 13*a* and the placement space 15 provided on the flat board part 10 of the base 1, so as to be capable of sliding in the width direction of the flat board part 10 of the base 1, that is, the direction (sliding direction) indicated by the arrow in FIGS. 10 and 12. Also, the bearing part 24 of the holding member 2 is placed in contact with one end of the urging member S1 disposed in the placement space 15*b* of the base 1. Also, the other end of this urging member S1 contacts the inner end face of the placement space 15*b*. In the present example, the urging member S1 is a coil spring.

When the sliding board part 21 of the holding member 2 is slid in the abovementioned sliding direction, the space between the bearing part 24 of the holding member 2 and the inner end face of the placement space 15*b* is narrowed, and the urging member S1 is compressed. That is, when the sliding board part 21 of the holding member 2 is slid in the above-mentioned sliding direction, the sliding board part 21 comes to be slid in opposition to the urging force applied to the sliding board part 21 by way of the bearing part 24 from the urging member S1. Accordingly, for example, when the sliding board part 21 of the holding member 2 is slid so that the grip width between the holding piece part 12 and the holding piece part 22 is narrowed from the width (initial width) indicated by L in FIG. 7 to the width indicated by L1 in FIG. 10, the urging member S1 applies an urging force moving to return the sliding board part 21 to the position indicated in FIG. 7 by way of the bearing part 24. Also, a buffering cushion material C2 is installed on the mutually opposite faces of the holding piece part 12 and the holding piece part 22. Also, when the sliding board part 21 is slid, the rack 23 moves following the clearance part 15*a*, and the bearing part 24 moves following a clearance part provided on the rib delineating the placement space 15*b*.

The release button 3 has a body 30, an operating part 31, a cutout part 32, and a cutout part 34. The maximum width of the body 30 is roughly equal to the inner width of the placement part placement space 16. The operating part 31 is exposed from the opening 13*b* provided on the flat board part 10 when the body 30 of the release button 3 is placed in the placement space 16. The cutout part 32 and the cutout part 34 are portions where both edges following the long direction of the body 30 are cut out inside. Of these, an engaging portion 33 for coupling with the gear 40 is provided in the cutout part 32, and the urging member S2 is disposed in the cutout part 34. In the present example, the urging member S2 is a coil spring, one end thereof contacts the bearing part 16*a* provided in the placement space 16 as mentioned above, and the other end contacts an end face of the cutout part 34. Also, the engaging portion 33 provided in the cutout part 32 is coupled with the teeth provided on the outer perimeter of the gear 40, by the urging force applied to the body 30 of the release button 3 by the urging member S2. In the present example, the engaging portion 33 is formed in an acute angular form so as to couple easily with the teeth on the outer perimeter of the gear 40.

When the operating part 31 of the release button 3 exposed from the opening 13*b* is pressed, the body 30 slides in the width direction of the flat board part 10 in opposition to the abovementioned applied urging force. Also, the engaging portion 33 separates from the gear 40 (the coupling is released), and the gear 40 becomes capable of rotation. When pressing of the release button 3 is stopped, the release button returns to the position before pressing by the urging force from the urging member S2.

The locking device 4 include the gear 40 rotating centered on a rotating shaft fixed to the base 1, the urging member S2 urging the engaging portion 33 integrally provided with the release button 3 in the direction of coupling with the gear 40, the rack 23 provided on the holding member 2, the pinion 44 engaging with the rack 23 and rotating centered on the same rotating shaft as of the gear 40, and the clutch member 46 disposed between the gear 40 and the pinion 44. The locking device 4 also includes the rotary damper 35 and the gear 38 interposed between a damping gear 37 of the damper 35 and the pinion 44.

In the present example, the clutch member 46 is a one-way clutch that becomes disconnected from the gear 40 and slips only when the pinion 44 is rotated in one direction. Also, the gear 40, pinion 44, and clutch member 36, which are the main members of the locking device 4, constitute a double-gear one-way clutch together with the release button 3. The gear 40 couples the engaging portion 33 in the state when the release button 3 is not pressed, and the coupling with the engaging portion 33 is released and the gear 40 becomes capable of rotation by pressing of the release button 3, as described above. A recessed part 42 hollowed out in a circular shape is provided on one of the upper and lower faces of the gear 40. Also, a boss part 43 projecting perpendicularly to the upper and lower faces of the gear 40 is provided in the center of the recessed part 42. Also, a shaft hole is provided in the center of this boss part 43. In the present example, the depth of the hollow of the recessed part 42 is shallower than the thickness of the pinion 44. Accordingly, teeth on the outer perimeter of the pinion 44 protrude from the recessed part 42 when the pinion is placed in the recessed part 42. Also, these protruding teeth engage with the rack 23 provided on the holding member 2. Accordingly, for example, when the holding member 2 is slid from the position illustrated in FIG. 9 to the position indicated by the arrow in FIGS. 10 and 12, the pinion 44 is rotated along with that sliding.

The pinion 44 has formed an installation hole 45 for installing the clutch member 46 in the center part. The clutch member 46 has a through-hole 47 provided in the center, and has a D-cut part 48 provided on the outer perimeter. Also, the clutch member 46 is pressed against the installation hole 45 of the pinion 44 by way of the D-cut part 48. Also, the clutch member 46 is connected to the gear 40 by pressing of the boss part 43 of the gear 40 into the through-hole 47 of the clutch member 46.

The members of the locking device 4 are assembled in this manner, and the shaft part 14a provided in the placement space 14 is then insertion-coupled in the shaft hole of the boss part 43 in a state in which the pinion 44 is turned downward, whereby the entirety is placed on the axial line of the shaft part 14a. The gear 38 and the rotary damper 35 are first incorporated in the placement space 14 when the members of the locking device 4 are assembled in this manner. The gear 38 is such that a shaft hole provided therein is insertion-coupled with a shaft part, not illustrated, provided in the placement space 14, and teeth on the outer perimeter thereof are engaged with the pinion 44. The rotary damper 35 has a body 36 and a gear 37, and is damped with a fluid injected inside the body 36. The gear 37 and the gear 38 engage when the body 36 of the rotary damper 36 is installed in the placement space 14 by way of screws M2, and the like. The holding member 2 is thereby damped so as not to be slid rapidly by the urging force of the urging member S1.

The cover 17 is installed on the base 1 so as to cover the lower face of the base 1 after the members of the locking device 4, and the like, are placed on the side of the flat board part 10 in the above manner. The cover 17 includes a board part 18 corresponding to the flat board part 10, and a step part 19 corresponding to the extended part 11. An opening 18a in which a part of the sliding part 21 of the holding member 2 is exposed, an opening 18b in which a part of the operating part 31 on the button side is exposed, the abovementioned positioning hole 18c, an insertion-coupling hole 18d allowing clearance for the shaft part 14a, and a plurality of screw insertion holes 18e are formed on the board part 18. A boss part 19a to be inserted in the locking hole 11c, an insertion-coupling hole 19b corresponding to the adjustable connection device 7, and installation holes 19c for screwing in the screws M2 are formed on the step part 19. Also, the cover 17 is attached to the base 1 by screwing a plurality of screws M into the insertion holes 18e provided on the cover 17 and the installation holes 10d provided on the base 1.

(Structure of Configuration for Supporting and Receiving Article Holding Device 9)

The above article holding device 9 is moved in and out of the housing 5 by way of the slider 6 to be switched between the housing position and the drawn-out position, and is supported to be capable of adjusting an angle downward and to be capable of adjusting rotation to the left and right by way of the adjustable connection device 7 in the drawn-out position, for example, as illustrated in FIGS. 1 to 3 and 14.

The housing 5 is a roughly parallelepiped-shaped case covered by an upper face 50, a lower face 51, side faces 52, and a back face 53, and has an opening provided on one end in the long direction. This housing 5 is fixed, for example, in a state being embedded in an instrument panel, or the like, of an automobile. The upper face 50 has a long and slender through-slot 54 provided from front to back, a rack part 55 provided on an inside end face of the through-slot 54 and extending in the long direction, for engaging with the gear 37 of the rotary damper 35 to be described later, and a support hole 50a running through in a position in the middle from left to right on the rear end side.

A rocking member 80 constituting latch device 8 is pivotally supported to be capable of rotation in the support hole 50a. The rocking member 80 constitutes a push-push locking mechanism of the latch device 8 together with a heart cam groove 83 on the slider side to be described later. In this example, the rocking member 80 includes a shaft part 81 for installation placed projecting on an upper face on one end of the rocking member 80, to be insertion-coupled in the support hole 50a, and a pin part 82 placed projecting on a lower face on the other end of the rocking member 80. The above rocking member 80 is supported in a state in which both sides of the shaft part 81 are lightly held inside an angle-bracket-shaped spring sheet not illustrated, and is rocked in opposition to the elasticity of the spring sheet. Meanwhile, both side faces 52 have an installation part 56 placed projecting on the outside at the front, and have a guide slot 57 extending from front to back on the inside as a guide for rocking of the slider 6. A spring stopping part 58 is provided on the lower face 51 on the side of the opening. The symbol 59 indicates an opening cut out toward the rear from slightly toward the depth from the opening, positioned roughly in the middle from left to right.

The slider 6 has a small block form, and integrally has a heart cam groove 83 provided in an upper recessed part formed in a middle part 60 from left to right, a damper installation hole 66a provided in an upper recessed part 66 formed in a left-side part 61, a hole part 67 running through a right-side part 62 from top to bottom and supporting a coil spring 85 to be capable of rotation, guide ribs 63 provided on left and right side faces, to be insertion-coupled in corresponding guide slots 57 on the sides of the housing, an inverted concave-form part 64 for installation provided on a lower face of the middle part 60, and an inverted concave-form part 65 for guiding provided on a lower face of the right-side part, allowing clearance for a spring 87.

The rotary damper 35 is inserted inside the installation hole 66a, and the coil spring 85 is supported in the hole part 67. The damper 35 is the same as the abovementioned damper 35. A gear 37 damped by a fluid is provided inside a body 36, and the gear 37 projects from the upper recessed part 66 and engages with the rack part 55 disposed on the side of the housing 5 in a state in which the body 36 is installed in the installation hole 66a. The coil spring 85 has a band-form spring wound onto a corresponding part of a body 86, and is supported to be capable of rotation in a state in which shaft parts 86a on both sides are insertion-coupled in corresponding recessed parts of the hole part 67. Also, the spring 87 is drawn out in the course of movement of the slider 6 to the depth part of the housing 5 in a state in which a drawn-out end 87a of the spring 87 is stopped on a stopping part 58 on the side of the housing, and the coil spring 85 urges the slider 6 and the article holding device 9 in the direction of projecting to the front of the housing 5 by virtue of the return force thereof.

The heart cam groove 83 locks the slider 6 and the article holding device 9 in the housing position in the housing in opposition to the urging force of the coil spring 85 by coupling of the pin part 82 in a locking recessed part provided on the perimeter of a protruding island. The slider 6 retreats slightly when being pressed by way of the article holding device from this state, and the pin part 82 is unlocked from the locking recessed part. With this push-push locking mechanism, the article holding device 9 is locked in the housing position by operation of the pin part 82 and the heart cam 83, having been pushed inside the housing in opposition to the urging force of the coil spring 85 by the slider 6, and when the article holding device 9 is next pushed in the direction of pushing inward and the hand is let go, the locking is unlocked and the article holding device 9 is enabled to advance to the drawn-out position by the urging force of the coil spring 85 by way of the slider 6.

Figure 15:
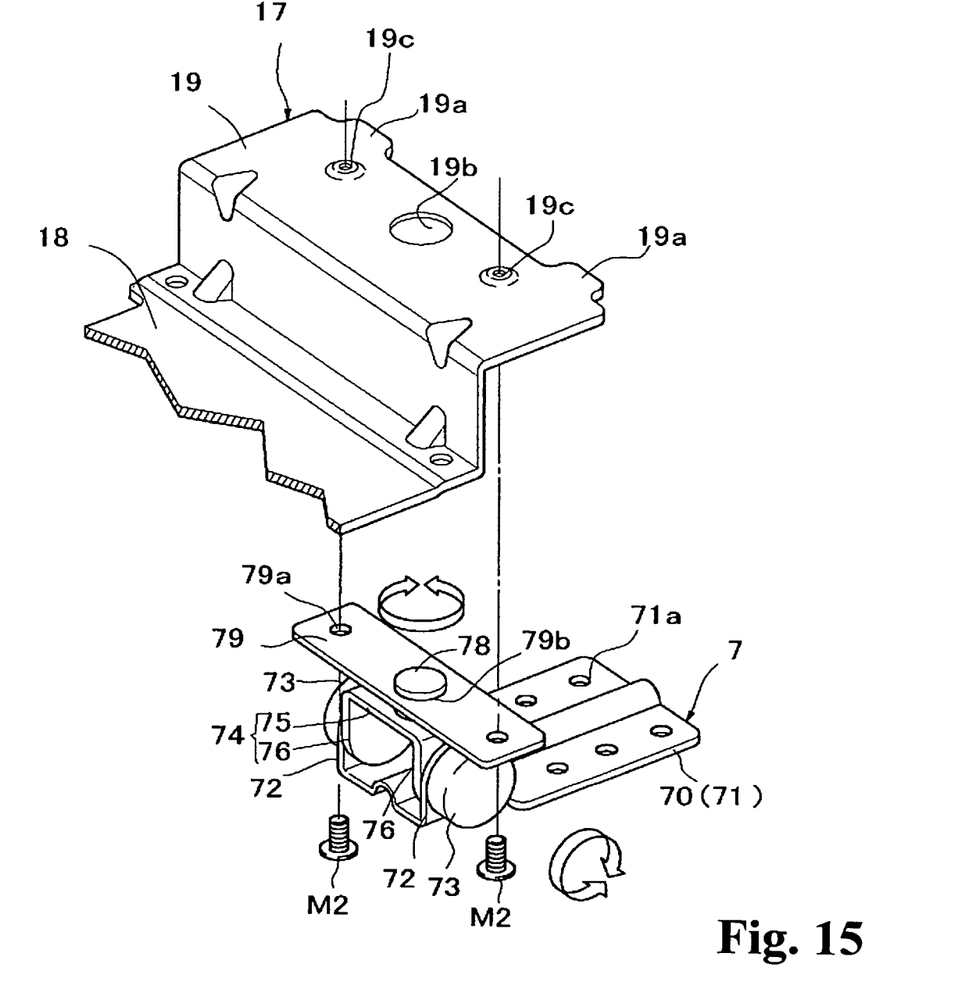
FIG. 15 is a structural diagram showing the structure supporting the abovementioned article holding device to be capable of angle adjustment and rotation.

The adjustable connection device 7 includes a slider-side installation body 70, a base-side installation body 79, and a movable body 74 interposed between the installation bodies 70 and 79, as illustrated in FIG. 15. Of these, the installation body 70 has integrally formed a horizontal board-form attachment part 71 placed in the inverted concave-form part 64 on the side of the slider, a pair of connecting parts 72 having bent a portion on the near side in the drawing of the attachment part 71 roughly into a U shape, to be placed inside the extended part 11 on the side of the base, and a circular bulging part 73 on the outer face side of each connecting part 72. Connecting holes for press-connection, not illustrated, being provided in a recessed shape from the side of the connecting part, are respectively provided on the connecting parts 72 and the bulging parts 73 on both sides. A movable body 74 is bent roughly into an angle-bracket shape having a size sufficient to be placed between both connecting parts. A shaft part 78 is provided in a center part of a middle part 75 of the angle-bracket shape. Shaft parts to be insertion-coupled in the connecting holes are provided on both side parts 76 of the angle-bracket shape.

Also, the movable part 74 is connected to the installation body 70, in a state in which both side parts 76 are placed between both connecting parts 72 and each aforementioned connecting part is insertion-coupled in the corresponding aforementioned connecting hole, to be capable of being adjusted to an arbitrary angle in the front-to-back direction in the same drawing, that is, downward, specified in claim 5, and of being held elastically after adjustment. The installation body 79 includes a long and slender board, and has installation holes 79a provided on both sides, and a coupling hole 79b running through a center part. Also, the installation body 79 is connected to the movable body 74 by insertion-coupling between the shaft part 78 and the coupling hole 79b, and is connected with the shaft part 78 as fulcrum, to be capable of being adjusted in the direction of the arrow in the same drawing, that is, to the left and right, specified in claim 5, and of being held elastically after adjustment. The numeral 68 in FIG. 14 indicates a cover for covering the main parts, being additionally provided to the adjustable connection device 7.

The installation body 79 of the above adjustable connection device 7 is fixed to the step part 19 on the side of the cover attached to the base 1 with two screws M2 being screwed into the corresponding installation holes 19c. At that time, the projecting end of the shaft part 78 is allowed clearance by the insertion-coupling hole 19. The article holding device 9 is such that only the attachment part 71 of the installation body 70 is projected to the outside from the window part 11b on the side of the extended part in the state in which the adjustable connection device 7 is attached. The attachment part 71 is then fastened by screws to the concave-form part 64 on the side of the slider. The article holding device 9 is thus switched between the housing position and the drawn-out position with respect to the housing 5 by way of the slider 6, and is used in a most easily used mode by way of the adjustable connection device 7 in the drawn-out position.

(Operating Characteristics of Article Holding Device 9)

A mode in which the article holding device 9 is installed in an instrument panel of a vehicle by way of the housing 5 is next described as an example while referring to the drawings. The housing 5 is normally attached in a state being embedded in an instrument panel, console, or other suitable place in a vehicle. The article holding device 9 may be received in a receiving part corresponding to the housing 5, integrally provided in an instrument panel or any kind of console in a vehicle, instead of the housing 5.

Figure 1:
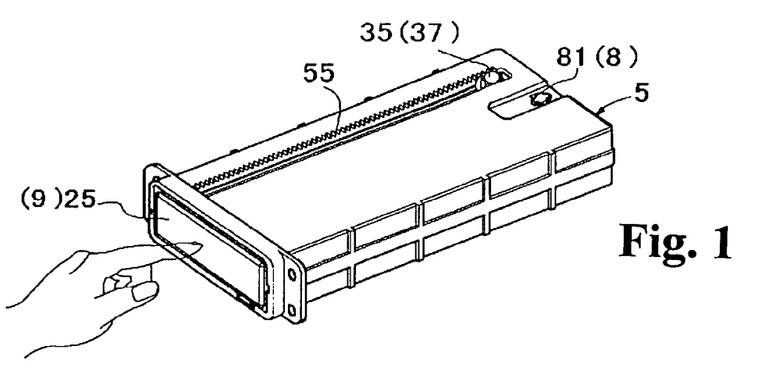
FIG. 1 is a diagram of the case when the article holding device of the present embodiment is in the housing position housed in the housing.

FIG. 1 illustrates a state in which the article holding device 9 is in the housing position being stored inside the housing 5, that is, the article holding device 9 and the slider 6 are in the housing position. In this state, the slider 6 and the article holding device 9 are locked by operation of the pin part 82 and the heart cam groove 83 in the standard position inside the housing 5 in opposition to the urging force of the coil spring 85.

Figure 2:
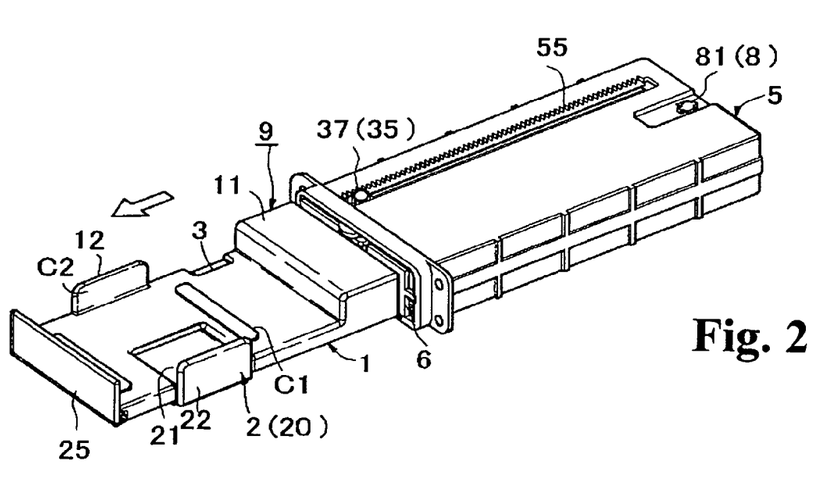
FIG. 2 is a diagram of the case when the article holding device of the present embodiment is in the drawn-out position drawn out from the housing.

When the rotating board 25 is pushed by a user's finger as illustrated in FIG. 1 and the finger is released from the above housing position, the article holding device 9 is unlocked by operation of the abovementioned pin 82 and heart cam groove 83, and is drawn out by the urging force of the coil spring 85 together with the slider 6 to the drawn-out position (in this drawn-out position, a locking claw, not illustrated, provided on the slider 6 contacts the front inner end of the opening 59 on the side of the housing 5). FIG. 2 illustrates a state in which the article-holding device 9 is thus drawn out to the drawn-out position. At this time, the advancing movement of the article holding device 9 and the slider 6 is damped by way of the damper 35.

Figure 3:
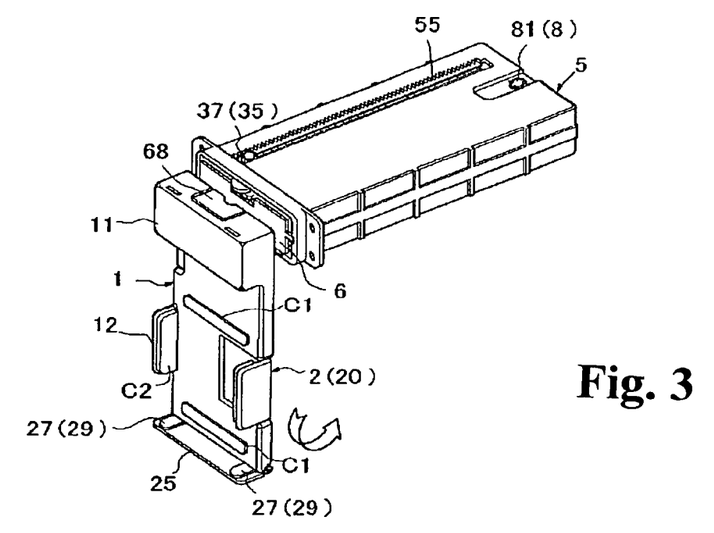
FIG. 3 is a diagram of the case when the article holding device of the present embodiment is in an in-use position.
Figure 4:
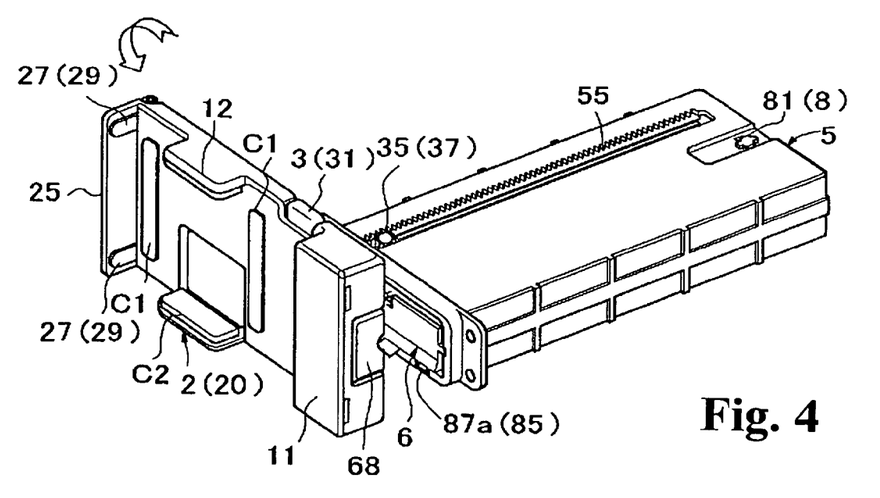
FIG. 4 is a diagram of the case when the article holding device of the present embodiment is in an in-use position different from that in FIG. 3.
Figure 5:
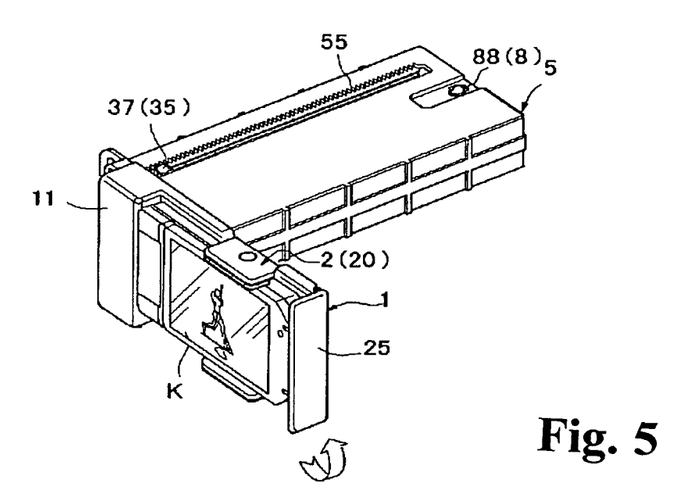
FIG. 5 is a diagram of the case when the article holding device of the present embodiment is in an in-use position different from those in FIGS. 3 and 4, and is a diagram of a state in which the article holding device is holding a cellular telephone as the article.
Figure 6:
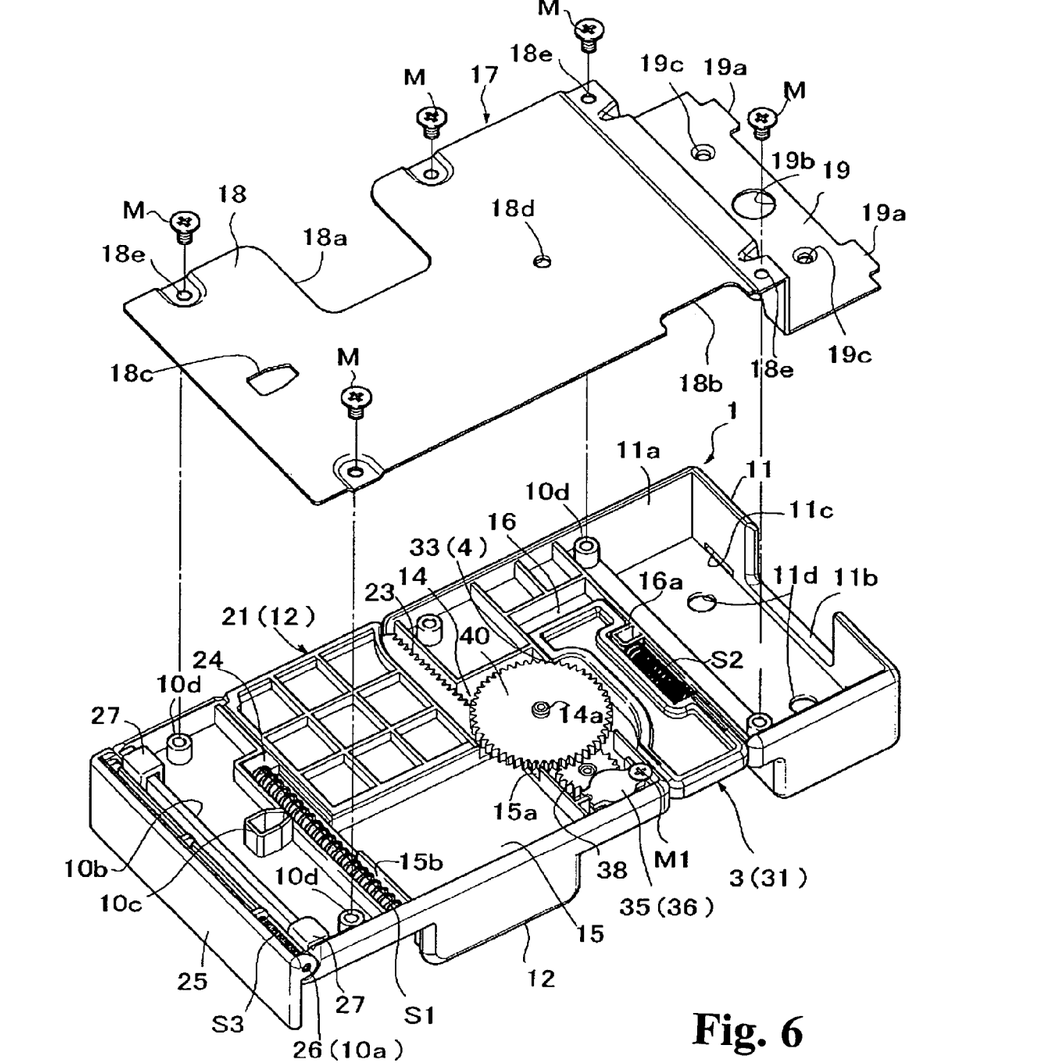
FIG. 6 is a generalized perspective view showing the article holding device of the present embodiment viewed from the bottom in a state in which the cover is removed.

FIGS. 3 to 5 are an example in which the article holding device 9 is made usable in a posture most convenient for the operator by adjusting the angle of tilt or angle of rotation by way of the abovementioned adjustable connection device 7 from the above drawn-out state.

Figure 7:
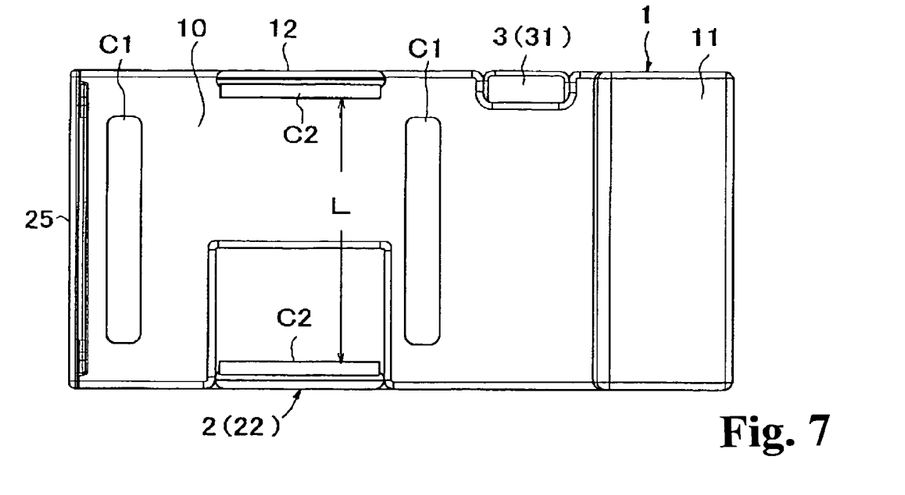
FIG. 7 is a plan view showing a state in which the cover of the article holding device of the present embodiment is removed and the grip width of the holding members is at maximum width L.
Figure 8:
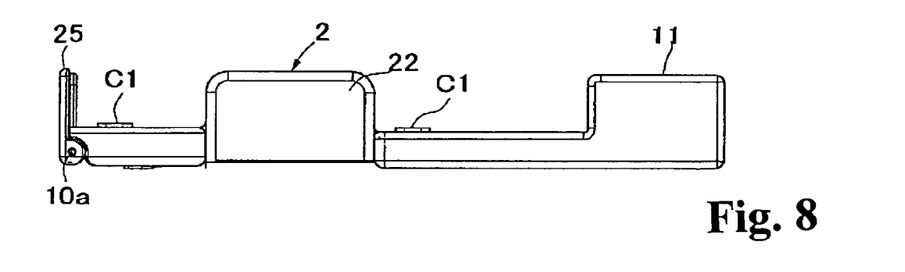
FIG. 8 is a side view showing a state in which the cover of the article holding device of the present embodiment is removed and the grip width of the holding members is at maximum width L.
Figure 9:
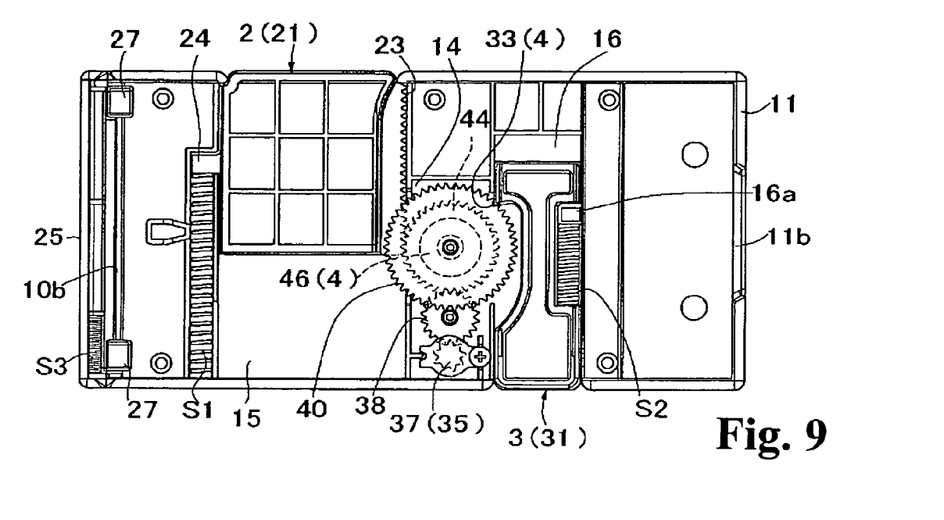
FIG. 9 is a bottom view showing a state in which the cover of the article holding device of the present embodiment is removed and the grip width of the holding members is at maximum width L.

Specifically, the article holding device 9 described above is such that, when in a state not in use, the distance, that is, the grip width between the holding piece part 22 on the holding member 2 and the holding piece part 12 on the stationary side was brought to the maximum width L by the urging force of the urging member S1, as illustrated in FIGS. 7 to 9.

Figure 10:
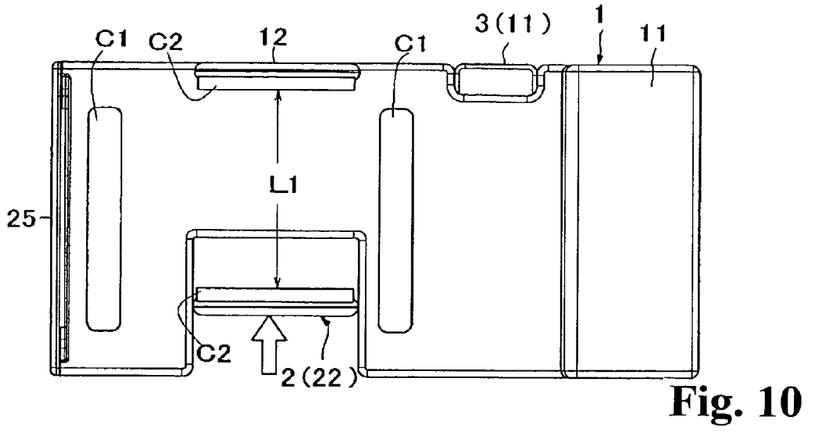
FIG. 10 is a plan view showing a state in which the grip width of the holding members of the article holding device of the present embodiment is reduced to L1.
Figure 11:
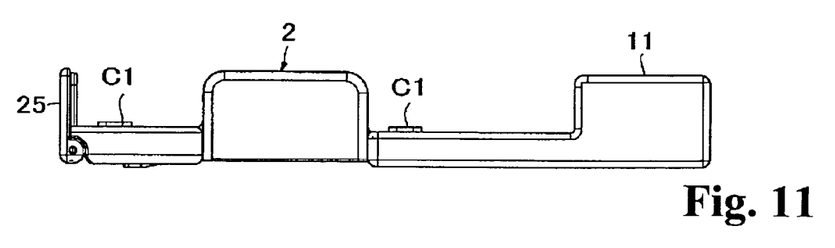
FIG. 11 is a side view showing a state in which the grip width of the holding members of the article holding device of the present embodiment is reduced to L1.
Figure 12:
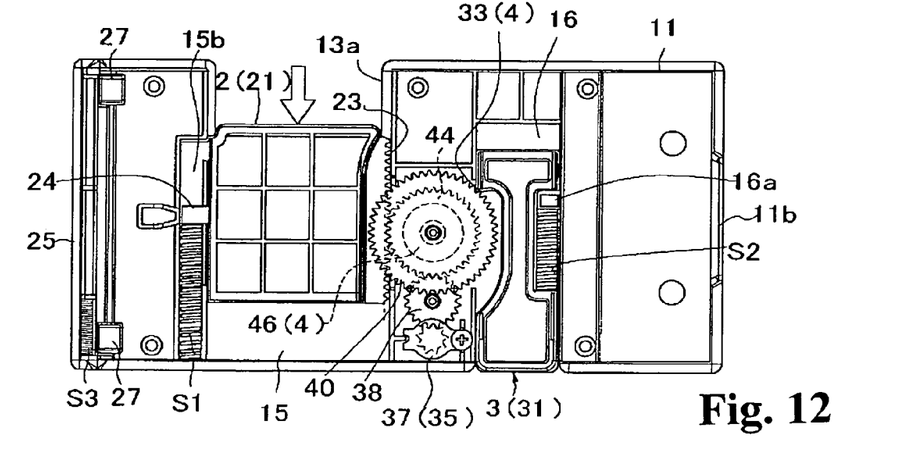
FIG. 12 is a bottom view showing a state in which the grip width of the holding members of the article holding device of the present embodiment is reduced to L1.
Figure 13:
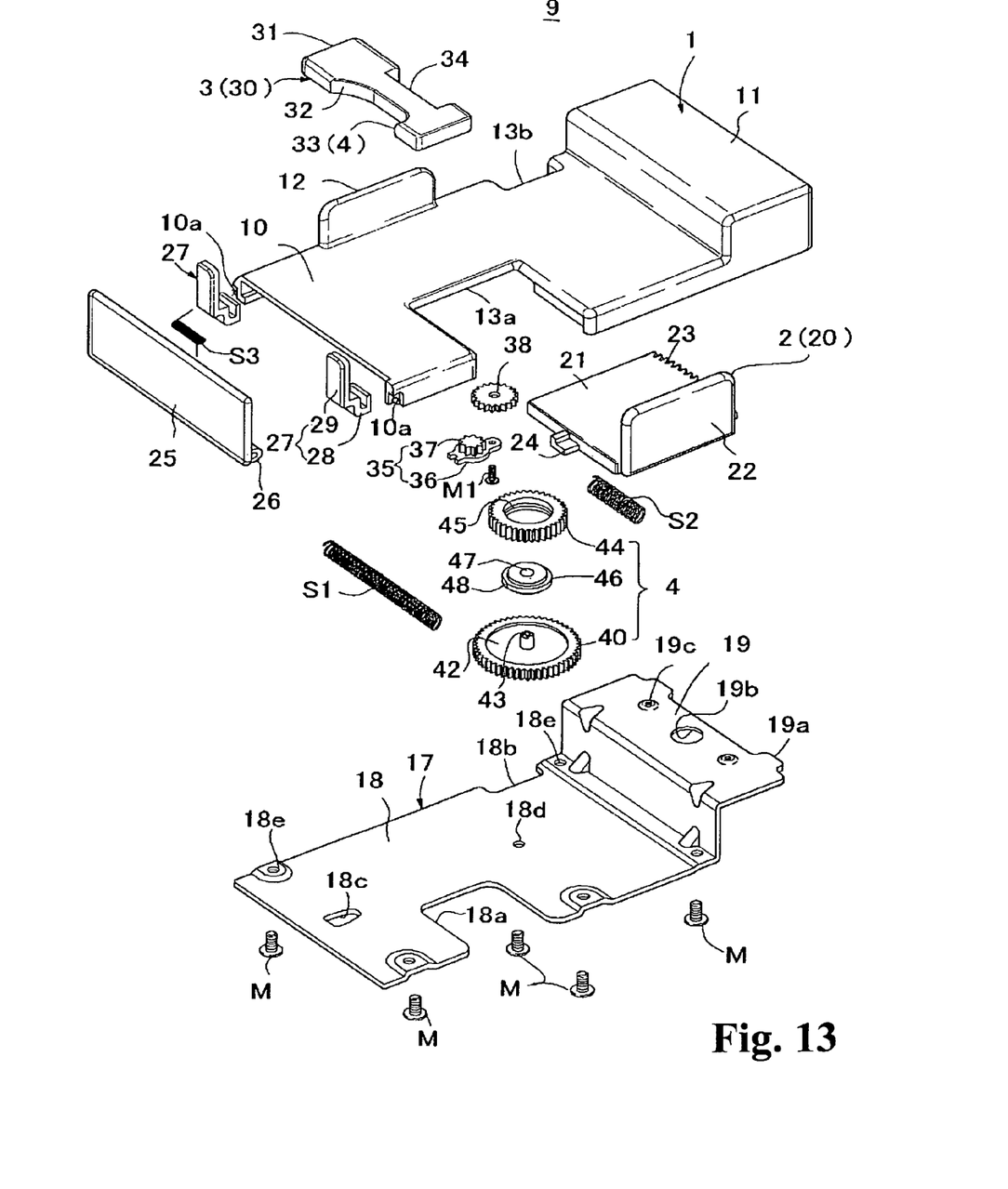
FIG. 13 is a generalized exploded perspective view showing the essential parts of the abovementioned article holding device.
Figure 14:
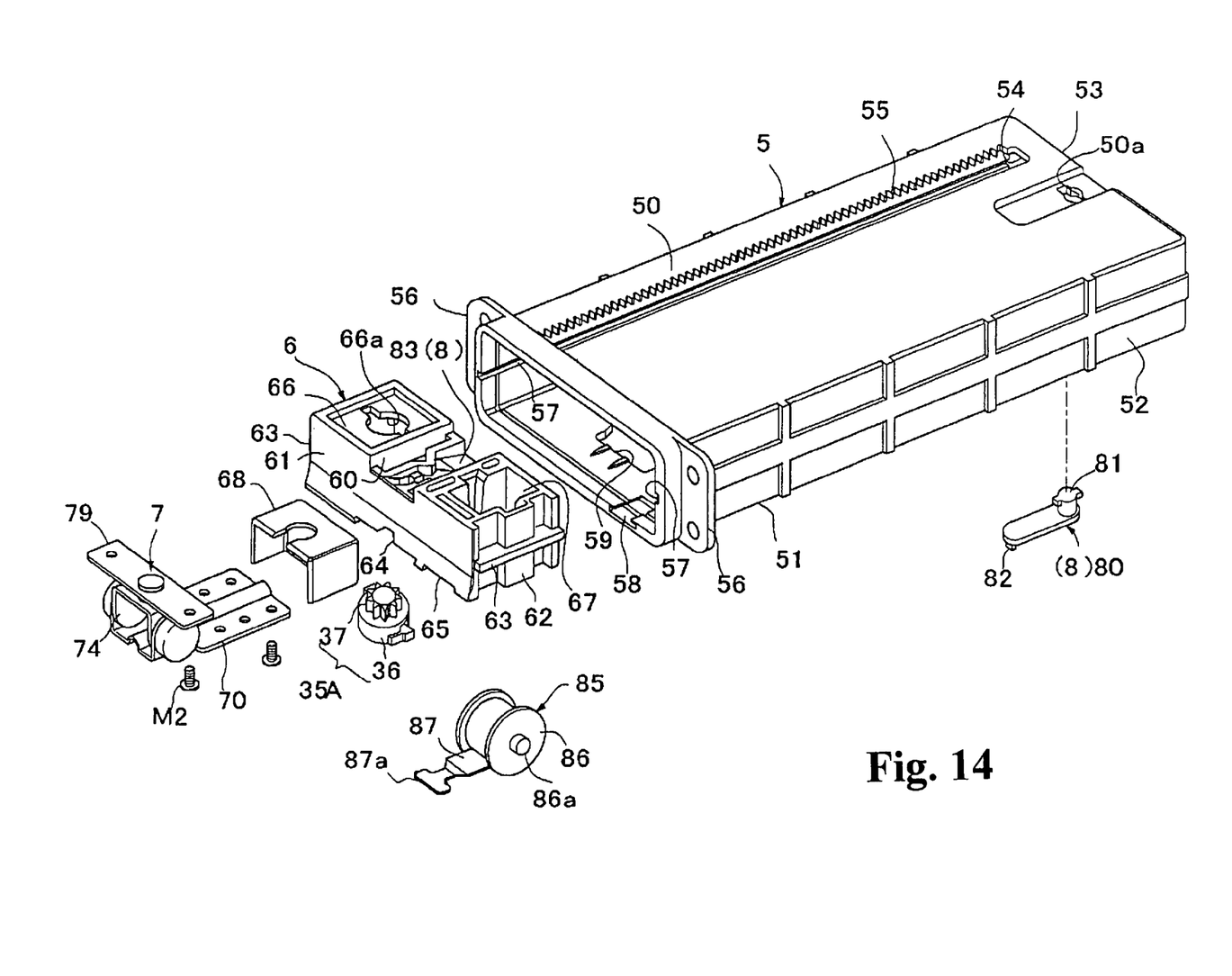
FIG. 14 is a generalized exploded perspective view showing the housing side of the abovementioned article holding device.

Also, in the case when holding a cellular telephone K or other article in the article holding device 9, illustrated in FIG. 5, the article is placed between the holding piece part 22 and the holding piece part 12 of the article holding device 9 in the abovementioned state not in use, and the holding member 2 is then operated to slide in the direction indicated by the arrow in FIGS. 10 and 12. At that time, when the holding member 2 is pressed in the direction indicated by the arrow in FIGS. 10 and 12, in the abovementioned double-gear one-way clutch, the pinion engaged with the rack 23 is rotated counterclockwise (the clutch member becomes clutch-off) and slips. The production of a "clicking" sound, mentioned as a problem, is thereby assuredly eliminated.

Next, when pressing of the holding member 2 is stopped in a state in which both side faces of the article as article of holding are gripped by the holding piece part 22 and the holding piece part 12 on the stationary side, that is, at a position where the width between the holding piece part 22 and the holding piece part 12 on the stationary side becomes about equal to the width of the article, the holding member 2 moves to return to the original position by the urging force of the urging member S1. Also, at this time, the pinion 44 engaged with the rack 23 on the side of the holding member 2 relays counterclockwise rotational torque to the gear 40. However, the gear 40 is coupled with the engaging portion 33 and therefore cannot rotate. Accordingly, the holding member 2 stops at the position where pressing was stopped. The state in which the article is held between the holding piece part 22 and the holding piece part 12 is thereby maintained.

When removing the held article from the article holding device 9, the release button 3 is pressed in opposition to the urging force of the urging member S2. The coupling between the gear 40 and the engaging portion 33 is thus released and the gear 40 becomes in a state capable of rotation. The holding member 2 thereby returns to the original initial force (the grip width becomes L) by the urging force of the urging member S1. At that time, the clutch member 46 becomes clutch-on, and the gear 40 and the pinion 44 rotate clockwise together. In this structure, the pinion 44 is engaged with the damper 35 by way of the second gear 38 and is therefore damped, and the holding member 2 thereby returns gently. The defect of an impact sound can therefore be eliminated even when the urging force of the urging member S1 is set strongly. Of course, the damper 35 is adopted because of the increase of quality, but there is no problem even if it is omitted.

As above, the article holding device 9 according to the present embodiment is such that the pinion 44 becomes in a state not connected with the gear 40 and slips (the pinion 44 is rotated alone) when the pinion 44 is rotated in one direction by way of the clutch member 46 (one-way clutch), and the pinion 44 is connected with the gear 40 and rotates in synchronization when the pinion 44 is rotated in the direction opposite the abovementioned one direction. Accordingly, the article holding device 9 of the present embodiment can prevent the production of a sound (the abovementioned clicking sound) caused by engagement between the engaging portion 33 and the gear 40 when the pinion 44 is rotated in the abovementioned one direction, compared with an article holding device in which the gear 40 always operates in linkage with the sliding of the holding member 2 regardless of the sliding direction of the holding member 2.

In the article holding device 9 of the present embodiment, the pinion 44 is rotated in the abovementioned one direction when the holding member 2 is slid in the direction of reducing the grip width, but in another example of the article holding device 9, the pinion 44 may be rotated in the abovementioned rotation when the holding member 2 is slid in the direction of enlarging the grip width.

Also, in the article holding device 9 according to the present embodiment, the pinion 44 engaging with the rack 23 on the side of the holding member 2 is provided, and (the damping gear 37 of) the rotary damper 35 can therefore be easily connected to the pinion 44 by way of the gear 38. The rotary damper 35 may be directly connected to the pinion 44 instead of the present example.

Also, in the article holding device 9 according to the present invention, the pinion slips when the holding member 2 is slid in the direction of reducing the grip width (for example, to hold an article). Accordingly, the production of a sound caused by engagement between the engaging portion 33 and the gear 40 can be prevented. In the article holding device 9, the holding member 2 is slid by urging force in the direction of enlarging the grip width when the release button 3 is pressed (for example, to again remove the article from the held state). Also, at this time, the holding member 2 returns to the original position while sliding gently rather than returning to the original position suddenly, because of the presence of the abovementioned rotary damper 35.

Also, the article holding device 9 according to the present embodiment can be received inside a housing space on the side of a vehicle, or in a housing 5 installed in an embedded state in that housing space. The article holding device 9 therefore does not occupy space inside the vehicle compartment when not in use, and the comfortableness of the vehicle compartment can be improved.

Also, the article holding device 9 according to the present embodiment can be set so that the long direction is oriented downward from the slider 6 or is oriented sideways in the state drawn out to the drawn-out position, and adjustment of the angle, and the like, can thus be performed easily.

The present invention has been described above using the embodiment, but the technological scope of the present invention is not limited to the scope of the above-mentioned embodiment. It is evident to those skilled in the art that various modifications and improvements are possible.

The present specification is based on a Japanese patent application (Patent Application No. 2009-116258) filed May 13, 2009, and the substance thereof is incorporated by reference herein.

Explanation of the Symbols

1: Base (10: Flat board part, 11: Extended part, 12: Holding piece part, 17: Cover)
2: Holding member (20: Body, 21: Sliding part, 22: Holding piece part, 24: Bearing part, 25: Rotating board)
3: Release button (30: Body, 31: Operating part, 32, 34: Cutout part)
4: Locking device (33: Engaging portion, 40: Gear, 44: Pinion, 46: Clutch member (One-way clutch)
5: Housing (55: Rack part, 57: Guide groove, 58: Locking part)
6: Slider (60: Recessed part, 61: Space for placement of damper, 62: Space for placement of coil spring)
7: Adjustable connection device (70: Installation body on slider side, 79: Installation body on base side, 74: Movable body)
8: Latch device (80: Rocking member, 82: Pin part, 83: Heart-shaped cam groove)
9: Article holding device
M, M1, M2: Screw
S1, S2, S3: Urging member
K: cellular telephone (article)

What is claimed is:

1. An article holding device for gripping an article, comprising:
a base for placing the article;
a holding member adjacent the base, capable of sliding along a grip width for sandwiching the article; and
a locking device mounted in the base for holding said holding member in a position after sliding;
wherein said locking device includes a gear, an engaging portion engageable with said gear, an urging member to apply an urging force to engage said engaging portion with said gear, a release button releasing coupling between said engaging portion and said gear by being pressed, a rack disposed on said holding member, a pinion having a common rotating shaft with said gear and engaging with said rack, and a one-way clutch interposed between said gear and said pinion, and slipping as a state disconnected from said gear only when said pinion rotates in one direction.

2. An article holding device according to claim 1, wherein said one-way clutch is arranged to slip said pinion against said gear when said holding member is sliding in a direction of reducing the grip width, and said pinion and said gear are in the connected state when said holding member is sliding in a direction of enlarging the grip width by pressing the release button and releasing the coupling between said engaging portion and said gear.

3. An article holding device for gripping an article, comprising:
- a base for placing the article;
- a holding member adjacent the base, capable of sliding along a grip width for sandwiching the article; and
- a locking device mounted in the base for holding said member in a position after sliding;

wherein said locking device includes a gear, an engaging portion engageable with said gear, an urging member to apply an urging force to engage said engaging portion with said gear, a rack disposed on said holding member a pinion having a common rotating shaft with said gear and engaging with said rack, and a one-way clutch interposed between said gear and said pinion, and slipping as a state disconnected from said gear only when said pinion rotates in one direction, and wherein said article holding device is switchable between a housing position housed in a housing space on a side of a vehicle and a drawn-out position drawn out from said housing space.

4. An article holding device according to claim 3, wherein said article holding device is fixed to a slider capable of sliding inside a housing embedded in said housing space, and through said slider, is capable of switching between the housing position housed inside said housing and the drawn-out position drawn out from an opening provided on one end of said housing.

5. An article holding device according to claim 3, wherein said article holding device is connected to said slider through an adjustable connection device, and is connected adjustably to angle downward and to rotate to the left and right in said drawn-out position.

* * * * *